United States Patent [19]

Beach et al.

[11] Patent Number: 5,869,564
[45] Date of Patent: Feb. 9, 1999

[54] INK COMPOSITION

[75] Inventors: Bradley Leonard Beach, Lexington, Ky.; Arthur Fred Diaz, San Jose, Calif.; Seong-Jin Kim, Mountain View; Dennis Richard McKean, San Jose, both of Calif.; Anna Marie Pearson, Richmond, Ky.; Jing Xiao Sun; Ajay Kanubhai Suthar, both of Lexington, Ky.; Richard Barber Watkins, Frankfort, Ky.

[73] Assignee: International Business Machines Corporation, Armonk, N.Y.

[21] Appl. No.: 360,199

[22] Filed: Dec. 21, 1994

[51] Int. Cl.$^6$ .............................. C09D 11/00; C08L 83/04
[52] U.S. Cl. .................. 524/547; 106/31.85; 106/31.86; 106/31.89; 106/31.9; 106/31.6; 524/837
[58] Field of Search ..................................... 524/588, 547; 106/31.6, 31.85, 31.86, 31.89, 31.9

[56] References Cited

U.S. PATENT DOCUMENTS

| | | | |
|---|---|---|---|
| 3,836,598 | 9/1974 | Wheeler, Jr. | 260/827 |
| 4,597,794 | 7/1986 | Ohta et al. | 106/20 |
| 4,687,811 | 8/1987 | Sasaki et al. | 525/100 |
| 4,968,750 | 11/1990 | Eichenauer et al. | 525/100 |
| 5,085,698 | 2/1992 | Ma et al. | 106/20 |
| 5,106,908 | 4/1992 | Alsmarraie et al. | 525/105 |
| 5,139,574 | 8/1992 | Winnik et al. | 106/22 |
| 5,160,370 | 11/1992 | Suga et al. | 106/20 |
| 5,160,372 | 11/1992 | Matrick | 106/19 R |
| 5,169,436 | 12/1992 | Matrick | 106/20 D |
| 5,169,438 | 12/1992 | Matrick | 106/22 R |
| 5,172,133 | 12/1992 | Suga et al. | 346/1.1 |
| 5,180,425 | 1/1993 | Matrick et al. | 106/22 R |
| 5,184,148 | 2/1993 | Suga et al. | 346/1.1 |
| 5,221,334 | 6/1993 | Ma et al. | 106/20 D |
| 5,229,786 | 7/1993 | Suga et al. | 346/1.1 |
| 5,272,201 | 12/1993 | Ma et al. | 524/505 |
| 5,470,904 | 11/1995 | Loftin et al. | 524/261 |

FOREIGN PATENT DOCUMENTS

| | | | |
|---|---|---|---|
| 556 649A1 | 8/1993 | European Pat. Off. | C09D 11/00 |
| 556 650A1 | 8/1993 | European Pat. Off. | C09D 11/00 |
| 04045173 | 2/1992 | Japan . | |
| 04045174 | 2/1992 | Japan . | |
| 50416146 | 6/1992 | Japan . | |

OTHER PUBLICATIONS

Grant & Hackh's Chemical Dictionary Fifth Edition, p 532.

*Primary Examiner*—Jeffrey T. Smith
*Assistant Examiner*—D. Aylward
*Attorney, Agent, or Firm*—Robert B. Martin

[57] ABSTRACT

The invention relates to an aqueous ink composition for use in ink jet printers comprising an aqueous carrier; a pigment; and a copolymer comprising a hydrophilic segment having an acidic function group, and a hydrophobic segment having a hydrolytically stable siloxyl substituent.

11 Claims, No Drawings

INK COMPOSITION

TECHNICAL FIELD

The present invention relates to ink compositions for ink jet printers.

BACKGROUND OF THE INVENTION

Ink jet printing is accomplished by ejecting ink from a nozzle toward paper or another print medium. The ink is driven from the nozzles toward the medium in a variety of ways. For example, in electrostatic printing, the ink is driven from a nozzle toward a medium with an electrostatic field. Another ink jet printing procedure, known as squeeze tube, employs a piezo-electric element in the ink nozzle. Electrically-caused distortions of the piezo-electric element pump the ink through the nozzle and toward the print medium. In still another ink jet printing procedure, known as thermal or bubble ink jet printing, the ink is driven from a nozzle toward the print medium by the formation of an expanding vapor-phase bubble in the nozzle. These various printing methods are described in "Output Hard Copy Devices", edited by Durbeck and Sherr, Academic Press, 1988 (see particularly chapter 13 entitled "Ink Jet Printing").

Ink compositions for use in ink jet printers generally comprise deionized water, a water-soluble or water-miscible organic solvent, and a colorant. Generally, the colorant is a soluble dye. Unfortunately, inks comprising soluble dyes can exhibit many problems, such as poor waterfastness, poor lightfastness, clogging of the jetting channels as a result of solvent evaporation and changes in the dye's solubility, dye crystallization, ink bleeding and feathering when prints are formed on plain papers, poor thermal stability, chemical instability, and ease of oxidation. Many of these problems can be minimized by replacing the dyes used in ink formulations with insoluble pigments. In general, pigments have superior properties with respect to dyes, such as good waterfastness, good lightfastness, good image density, thermal stability, oxidative stability, the ability to perform intercolor ink mixing, and compatibility with both coated/treated and plain papers.

In pigmented ink compositions, the pigment dispersion is generally stabilized by a polymeric component. For example, Ma et al., U.S. Pat. No. 5,085,698, disclose an ink composition comprising pigment, aqueous medium, and an acrylic/acrylate block copolymer as a stabilizing agent. Destabilization of the pigment dispersion can result in precipitation of pigment in the nozzle of the ink jet printer which can eventually adversely impact the printing process. Most prior art pigment dispersions will irreversibly clog the nozzle of ink jet printers when left standing in the atmosphere for an extended period of time (e.g., 6 hours).

While prior pigmented ink compositions for ink jet printers did show transient stability for the pigment dispersion, improved pigment ink dispersion is desired to meet the demanding needs of commercial ink jet printers.

It is therefore an object of the present invention to provide an improved pigmented ink composition for ink jet printers.

Other objects and advantages will become apparent from the following disclosure.

SUMMARY OF THE INVENTION

The present invention relates to an aqueous ink composition for use in ink jet printers comprising: (a) an aqueous carrier medium; (b) a pigment; and (c) a copolymer component selected from a block or graft copolymer and comprising (i) a hydrophilic segment comprising a polymer or copolymer having an acidic functional group, and (ii) a hydrophobic segment comprising a polymer or copolymer having a hydrolytically stable siloxyl substituent. Preferably, the copolymer component is a graft copolymer and preferably is an acrylic graft copolymer.

A more thorough disclosure of the present invention is presented in the detailed description which follows.

DETAILED DESCRIPTION OF THE INVENTION

The present invention relates to an aqueous ink composition suitable for use in ink jet printers. The first component of the liquid ink composition is the copolymer component. The copolymer component is selected from a block or graft copolymer. The copolymer importantly functions to stabilize the pigment dispersion in the aqueous carrier medium. The copolymer also assists in redispersion of the pigment after drying out of the nozzle during printer shutdown.

The copolymer component comprises a hydrophilic polymeric segment comprising a hydrophilic polymer or copolymer, and a hydrophobic polymeric segment comprising a hydrophobic polymer or copolymer. A variety of hydrophilic polymers or copolymers can be utilized in the copolymer component of the present invention. Suitable hydrophilic polymers include polyvinyl alcohol, poly (vinyl pyrrolidone) and poly (4-vinylpyridine). Other suitable hydrophilic polymers will be known to those skilled in the art. The hydrophilic segment suitably has an acidic functional group such as a carboxy substituent. Preferably, the hydrophilic segment is an acrylic or methacrylic polymer or copolymer thereof. In an alternative embodiment, the hydrophilic segment can comprise an acrylic copolymer such as a copolymer of acrylic acid, and another monomer such as styrene which does not interfere with the hydrophilic character of the segment.

The hydrophobic polymeric segment comprises a polymer or copolymer having a hydrolytically stable linear or branched siloxyl substituent. A siloxyl substituent (an oligomeric siloxane) has the formula:

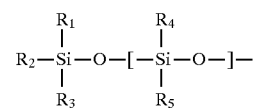

wherein n is 1–50, preferably 2–16, $R_1$ to $R_5$ are independently alkyl or aryl, preferably lower alkyl ($C_1$–$C_6$) phenyl or benzyl, and optionally substituted with a variety of noninterfering substituents. For branched siloxyl substituents, $R_4$ and/or $R_5$ are siloxyl substituents. Suitably, the siloxyl substituent will be terminated with a lower alkyl group. Preferably, $R_2$ is butyl and $R_1$ and $R_3$–$R_5$ are methyl. The siloxyl substituent is hydrolytically stable in that it does not react with water under neutral conditions. A preferred linear or branched substituent has the formula:

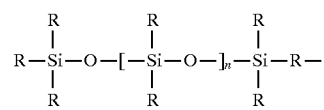

wherein n is 2–16, and each R is independently benzyl, siloxyl, or lower alkyl ($C_1$ to $C_8$, preferably $C_1$–$C_4$). Preferably, the hydrophobic segment is an acrylate or methacrylate ester (oxo or thio), or amide polymer having a siloxyl substituent (e.g., an oligomeric siloxane grafted to a polyacrylate or polymethacrylate). Other suitable hydrophobic copolymers having a siloxyl substituent will be known to those skilled in the art.

The copolymer component of the ink composition is a graft or block copolymer, preferably a graft copolymer. The graft and block copolymers of the present invention can be made by standard synthetic techniques such as those disclosed in Steven's Polymer Chemistry, An Introduction, Oxford University Press (1990), the disclosure of which is incorporated herein by reference. The copolymer component suitably has a molecular weight $M_N$ of about 800 to 5000. Suitably, the monomer ratio of the copolymer component of the ink composition (hydrophilic monomer to hydrophobic monomer) is about 10–100 hydrophilic monomer to 1 hydrophobic monomer, preferably about 40 to 1. The monomer ratio provides the copolymer component with its dispersibility property. The molecular weight of the copolymer component is controlled by a chain transfer agent such as an aliphatic thiol including n-butane thiol, or preferably n-dodecyl thiol. Both thiol chain transfer agents yield a copolymer component which provides the ink with excellent waterfastness. The copolymer component suitably comprises about 0.5 to about 10.0 weight % of the ink composition, preferably about 1 to 5 weight %. Suitable copolymers include acrylic acid/acrylate dialkylsiloxane copolymer and methacrylic acid/methacrylate dialkylsiloxane copolymer.

The second component of the ink composition is the pigment, an insoluble colorant. A wide variety of organic and inorganic pigments can be utilized in the ink composition of the present invention. Suitable pigments include, for example, azo pigments such as azo lakes, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes, and acid dye lakes; organic pigments such as nitro pigments, nitroso pigments, aniline black, daylight fluorescent pigments; and inorganic pigments such as titanium oxide, iron oxides, and carbon black. Even pigments not described in the Color Index can all be used so long as they are dispersible in an aqueous medium.

The amount of the pigments may vary depending on the structure, but they may commonly be used in an amount ranging from 1.0 to 10.0 weight %, and preferably from 2 to 6 weight % of the ink composition.

The third component of the ink composition of the present invention is the aqueous carrier medium. The aqueous carrier medium comprises water and preferably a water-soluble organic solvent. A preferred water-soluble organic solvent is a polyhydric alcohol such as ethylene glycol, propylene glycol, butylene glycol, triethylene glycol, 1,2,6-hexanetriol, thiodiglycol, hexylene glycol, and diethylene glycol; diols such as butanediol, pentanediol, hexanediol, and homologous diols; glycol esters such as propylene glycol laurate; glycerol; polyalkyl glycols such as polyethylene glycol; and lower alkyl ethers of polyhydric alcohols, such as ethylene glycol monomethyl or monoethyl ether, diethylene glycol methyl or ethyl ether, and triethylene glycol monomethyl or monoethyl ether.

Other suitable water-soluble organic solvents include alcohols such as methanol, ethanol, propanol, and butanol; ketones such as acetone; ethers such as tetrahydrofuron and dioxane; esters such as ethyl acetate, sulfolanes, N-methyl pyrrolidone, lactones such as γ-butyrolactone, lactams such as 2-pyrrolidone, 1-methyl-2-pyrrolidone, and 1-(2-hydroxyethyl)-2-pyrrolidone.

The ink composition is suitably prepared by mixing the components together in a blender. Optionally, a surfactant may be added to enhance the pigment dispersion and modify the surface tension of the ink to control penetration of the ink into the paper. Suitable surfactants include nonionic, amphoteric and ionic such as those disclosed in U.S. Pat. No. 5,106,416, the disclosure of which is incorporated herein by reference. Other additives such as biocides, humectants, chelating agents, and viscosity modifiers may be added to the ink composition. It generally is desirable to make the pigmented ink jet ink in concentrated form to enhance pigment dispersion, which is subsequently diluted to the appropriate concentration for use in the ink jet printing system.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

EXAMPLE 1

Copolymer Component (A) The methacrylic acid methacrylate dimethylsiloxane copolymer comprising methacrylic acid monomers and methacrylate monomers with siloxyl substituents was synthesized as follows:

A solution of methacrylic acid (16.3 g, 190 mmol), monomethacryloxypropyl terminated polydimethylsiloxane (5.0 g, 5 mmol), benzoyl peroxide (0.64 g, 2.65 mmol), n-butanethiol (0.51 mL, 4.67 mmol), and dioxane (80 mL) was degassed with argon (done by repeated partial evacuation followed by argon backfill using a Firestone valve) and heated to 90° C. for 16 hours. A gelatinous precipitate formed during the course of the polymerization. The mixture was allowed to cool to room temperature and then added slowly to rapidly stirred hexane (1.0 L). The resulting solid was isolated by vacuum filtration and then dried in vacuo for 16 hours at 75° C. 16.0 g of solid polymer were obtained (75%). The material was characterized by $H^1$ NMR analysis to determine the copolymer composition which indicated 98% (by mol) methacrylic acid.

(B) The copolymer stock solution was prepared by adding 12 grams of copolymer and 25 ml of water into a 250-ml beaker. The copolymer and water are stirred and 6 grams of KOH is slowly added with continued stirring until the copolymer is dissolved. The pH of the solution was adjusted to 8.0 and the solids content of the copolymer was reduced to 12% by the addition of deionized (DI) water.

EXAMPLE 2

Ink Composition Concentrate

| Components | Amount (Parts by Weight) |
|---|---|
| Carbon Black, DeGussa Corp., Special Black 4A | 27.0 grams |
| Copolymer dispersant stock solution | 75.0 grams |

| Components | Amount (Parts by Weight) |
|---|---|
| DI water | 52.4 grams |
| Ethylene glycol | 25.6 grams |

The components were premixed in a beaker by mechanical stirring. The mixing was continued until the carbon black was wet and there were no visible lumps. The carbon black was dispersed by an attrition process using a Szegvari attritor model 01 std with 10–12 mesh zirconium silicate shot at a speed of 700 rpm. The attrition process was typically performed for a minimum of one hour; however, longer times at controlled temperatures were also used. The carbon black dispersion mix is removed from the attritor and let down to a final percent solids of 17.5%.

EXAMPLE 3

Ink Composition

Inks are prepared by mixing the concentrated pigment dispersion prepared above with ethylene glycol and DI water. The biocide Proxel from ICI is also added. The formulation is given below:

| Components | Amount (Parts by Weight) |
|---|---|
| Pigment dispersion stock solution | 38.0 grams |
| Ethylene glycol | 19.5 grams |
| DI water | 75.0 grams |
| Proxel | 0.27 gram |

The final pH of the ink is adjusted to 8.0. The ink is filtered through a series of filters with the final filter being 1.2 microns. The median particle size as determined by an ultracentrifuge technique based on Stokes law is typically 60 nm.

EXAMPLE 4

Print Testing of Inks

The inks were print tested using an IBM Model IJ4076 printer manufactured by Lexmark. The print samples were generated on IBM Multisystem bond paper and gave the following results:

| | |
|---|---|
| Optical density | 1.30 as measured by a Macbeth densitometer |
| Edge sharpness and resolution | Excellent |

Waterfastness

Print samples were soaked in deionized water for 5 minutes. After drying, the optical density of the sample was measured to be 95% of the presoaked optical density.

Maintenance Testing

Capping stations of a Lexmark 4076 printhead were disabled to leave the printhead uncapped when the printer was not printing. The printer was left in standby mode for 6 hours at ambient conditions. The printer was then activated and run for 6750 heater fires for each of the 50 nozzles of the printhead. The ink composition enabled recovery of all 50 of the nozzles of the printhead. This compares favorably to ink compositions containing prior art dispersants (Rohm & Haas, Tamol SN; PPG-Masil 280; BASF-Pluronic; and Daniel Products—Dispers-AYD), all of which did not enable the recovery of any nozzles of the printhead.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. An aqueous ink composition for ink jet printers comprising an aqueous carrier, a pigment, and a copolymer component selected from a graft copolymer comprising:
    (a) a hydrophilic polymeric segment having a carboxy substituent; and
    (b) a hydrophobic polymeric segment having a hydrolytically stable siloxyl substituent optionally substituted with a $(C_{1-6})$alkyl, phenyl or benzyl substituent, said hydrophilic polymeric segment (a) being an amount of 10–100 hydrophilic monomers to 1 hydrophobic monomer of said hydrophobic polymeric segment (b).

2. The composition of claim 1 wherein the copolymer is an acrylic acid/acrylate dialkylsiloxane copolymer.

3. The composition of claim 1 wherein the copolymer is a methacrylic acid/methacrylate dialkylsiloxane copolymer.

4. The composition of claim 2 wherein the carrier is glycol and water.

5. The composition of claim 3 wherein the carrier is glycol and water.

6. An aqueous ink composition for ink jet printers comprising an aqueous carrier, a pigment, and a graft copolymer comprising:
    (a) a hydrophilic polymeric segment; and
    (b) a hydrophobic polymeric segment having a substituent having the formula:

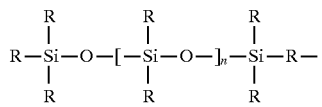

wherein n is 2–16, and each R is independently lower alkyl or siloxyl, said hydrophilic polymeric segment (a) being an amount of 10–100 hydrophilic monomers to 1 hydrophobic monomer of said hydrophobic polymeric segment (b).

7. The composition of claim 6 wherein the hydrophilic polymeric segment has a carboxy substituent.

8. The composition of claim 7 wherein the copolymer is an acrylic acid/acrylate copolymer.

9. The composition of claim 7 wherein the copolymer is a methacrylic acid/methacrylate copolymer.

10. The composition of claim 2 wherein the molecular weight of the copolymer component is controlled using an aliphatic thiol chain transfer agent selected from n-butane thiol or n-dodecyl thiol.

11. The composition of claim 3 wherein the molecular weight of the copolymer component is controlled using an aliphatic thiol chain transfer agent selected from n-butane thiol or n-dodecyl thiol.

* * * * *